US011873896B2

(12) United States Patent
Rosinski

(10) Patent No.: US 11,873,896 B2
(45) Date of Patent: Jan. 16, 2024

(54) SHIFT ACTUATOR FOR POWER TRANSFER UNIT

(71) Applicant: GHSP, Inc., Holland, MI (US)

(72) Inventor: Ryan David Rosinski, Whitehall, MI (US)

(73) Assignee: GHSP, Inc., Holland, MI (US)

( * ) Notice: Subject to any disclaimer, the term of this patent is extended or adjusted under 35 U.S.C. 154(b) by 0 days.

(21) Appl. No.: 17/680,472

(22) Filed: Feb. 25, 2022

(65) Prior Publication Data

US 2022/0299110 A1 Sep. 22, 2022

Related U.S. Application Data

(60) Provisional application No. 63/164,238, filed on Mar. 22, 2021.

(51) Int. Cl.
*F16H 63/00* (2006.01)
*F16H 63/30* (2006.01)
*F16H 63/32* (2006.01)

(52) U.S. Cl.
CPC .......... *F16H 63/304* (2013.01); *F16H 63/32* (2013.01); *F16H 2063/3056* (2013.01)

(58) Field of Classification Search
CPC ............... F16H 63/304; F16H 63/32; F16H 2063/3056; F16H 61/0003; F16H 2061/2892; F16H 2200/0034; F16H 61/32; F16H 63/18; B60K 17/3467
See application file for complete search history.

(56) References Cited

U.S. PATENT DOCUMENTS 10,385,949 B2 * 8/2019 Hamrin .................. F16H 3/001

* cited by examiner

*Primary Examiner* — Victor L MacArthur
(74) *Attorney, Agent, or Firm* — Price Heneveld LLP

(57) ABSTRACT

A shift actuator includes a motor that drives a drum assembly having a disconnect track and a range track. Operation of the motor rotates the drum assembly about a rotational axis. A fork rod is positioned parallel with the rotational axis. A disconnect fork is slidably coupled with the disconnect track and the fork rod. A range fork is slidably coupled with the range track and the fork rod. The disconnect track and the range track define a plurality of actuating positions of the disconnect fork and the range fork. The plurality of actuating positions are defined by corresponding flat portions of the disconnect track and the range track that maintain a position of the disconnect fork and the range fork, respectively, relative to the fork rod.

17 Claims, 19 Drawing Sheets

SHIFT ACTUATOR FOR POWER TRANSFER UNIT

CROSS-REFERENCE TO RELATED APPLICATION

This application claims priority to and the benefit under 35 U.S.C. § 119(e) of U.S. Provisional Patent Application No. 63/164,238, filed on Mar. 22, 2021, entitled SHIFT ACTUATOR FOR POWER TRANSFER UNIT, the entire disclosure of which is hereby incorporated herein by reference.

FIELD OF THE DISCLOSURE

The disclosure is generally directed toward actuators for vehicular applications, and more specifically, a shift actuator for a power transfer unit that can be used within various portions of a transmission, such as a differential, and other portions of the transmission.

BACKGROUND OF THE DISCLOSURE

Within vehicles having variable four-wheel drive, a four-wheel drive setting can be engaged or disengaged during use of the vehicle. A power transfer unit is typically utilized for changing a transmission setting from a four-wheel drive state to a two-wheel drive state, and other similar power control settings.

SUMMARY OF THE DISCLOSURE

According to a first aspect of the present disclosure, a shift actuator includes a motor that drives a drum assembly having a disconnect track and a range track. Operation of the motor rotates the drum assembly about a rotational axis. A fork rod is positioned parallel with the rotational axis. A disconnect fork is slidably coupled with the disconnect track and the fork rod. A range fork is slidably coupled with the range track and the fork rod. The disconnect track and the range track define a plurality of actuating positions of the disconnect fork and the range fork. The plurality of actuating positions are defined by corresponding flat portions of the disconnect track and the range track that maintain a position of the disconnect fork and the range fork, respectively, relative to the fork rod.

According to another aspect of the present disclosure, a shift actuator includes a drum cam having a disconnect track and a range track. The drum cam rotates about a rotational axis. A fork assembly is positioned parallel with the rotational axis. A fork rod is positioned parallel with the rotational axis. The fork assembly slidably couples the disconnect track with the fork rod and slidably couples the range track with the fork rod. The disconnect track and the range track define a plurality of actuating positions of the fork assembly that are oriented generally perpendicular to the rotational axis. Rotation of the drum cam with the fork assembly in one of the actuating positions defines a low-torque area characterized by at least a portion of the fork assembly being maintained in a consistent axial position with respect to a drum. Rotation of the drum cam in the low-torque area builds momentum for operating the fork assembly through sloped portions of the disconnect track and the range track. The sloped portions are oblique to the rotational axis.

According to another aspect of the present disclosure, a shift actuator for a power transfer unit includes a motor that drives a drum assembly having a disconnect track and a range track. Operation of the motor rotates the drum assembly about a rotational axis. A fork rod is positioned parallel with the rotational axis and between the motor and the drum assembly. A disconnect fork extends between the disconnect track and the fork rod. A range fork extends between the range track and the fork rod. A position sensor is in communication with the motor and each of the disconnect fork and the range fork. Operation of the drum assembly slidably operates the disconnect fork through the disconnect track and along the fork rod relative to the position sensor. Operation of the drum assembly slidably operates the range fork through the range track and along the fork rod and relative to the position sensor. The position sensor stops operation of the motor and the drum assembly when the disconnect fork and the range fork define an actuating position relative to the drum assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
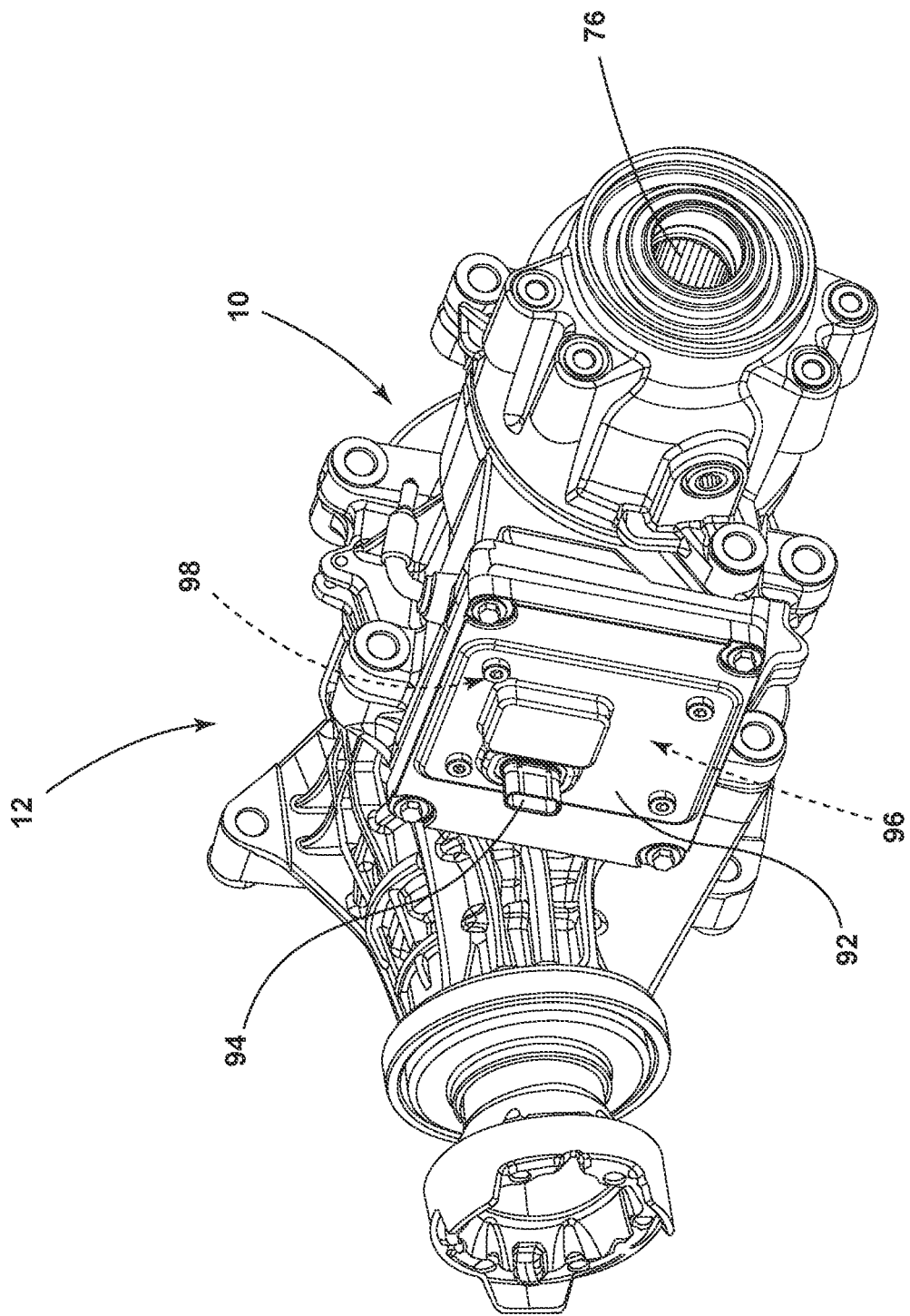
FIG. 1 is a perspective view of a power transfer unit of a vehicle that incorporates an aspect of the shift actuator.
Figure 2:
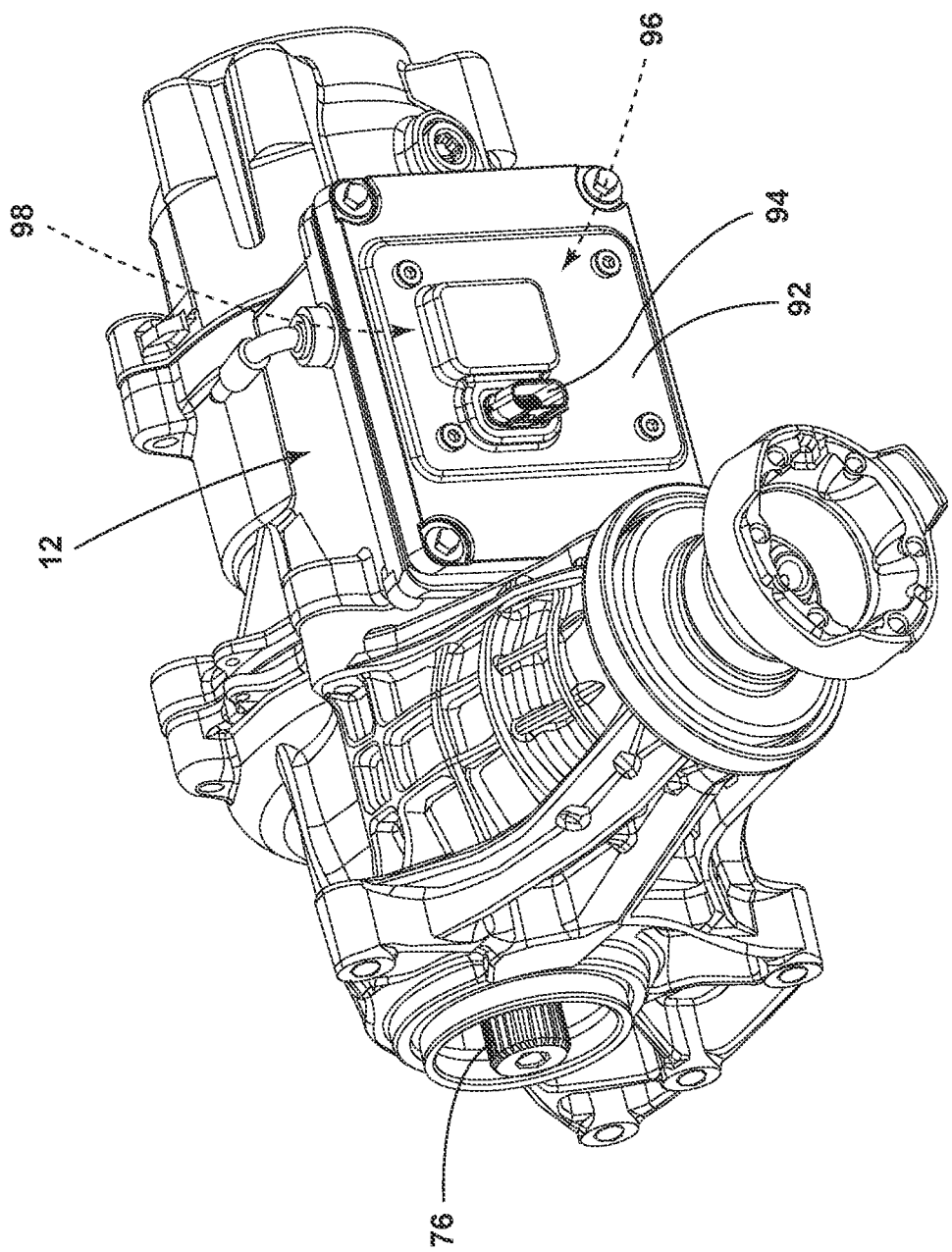
FIG. 2 is a perspective view of the power transfer unit of FIG. 1.
Figure 3:
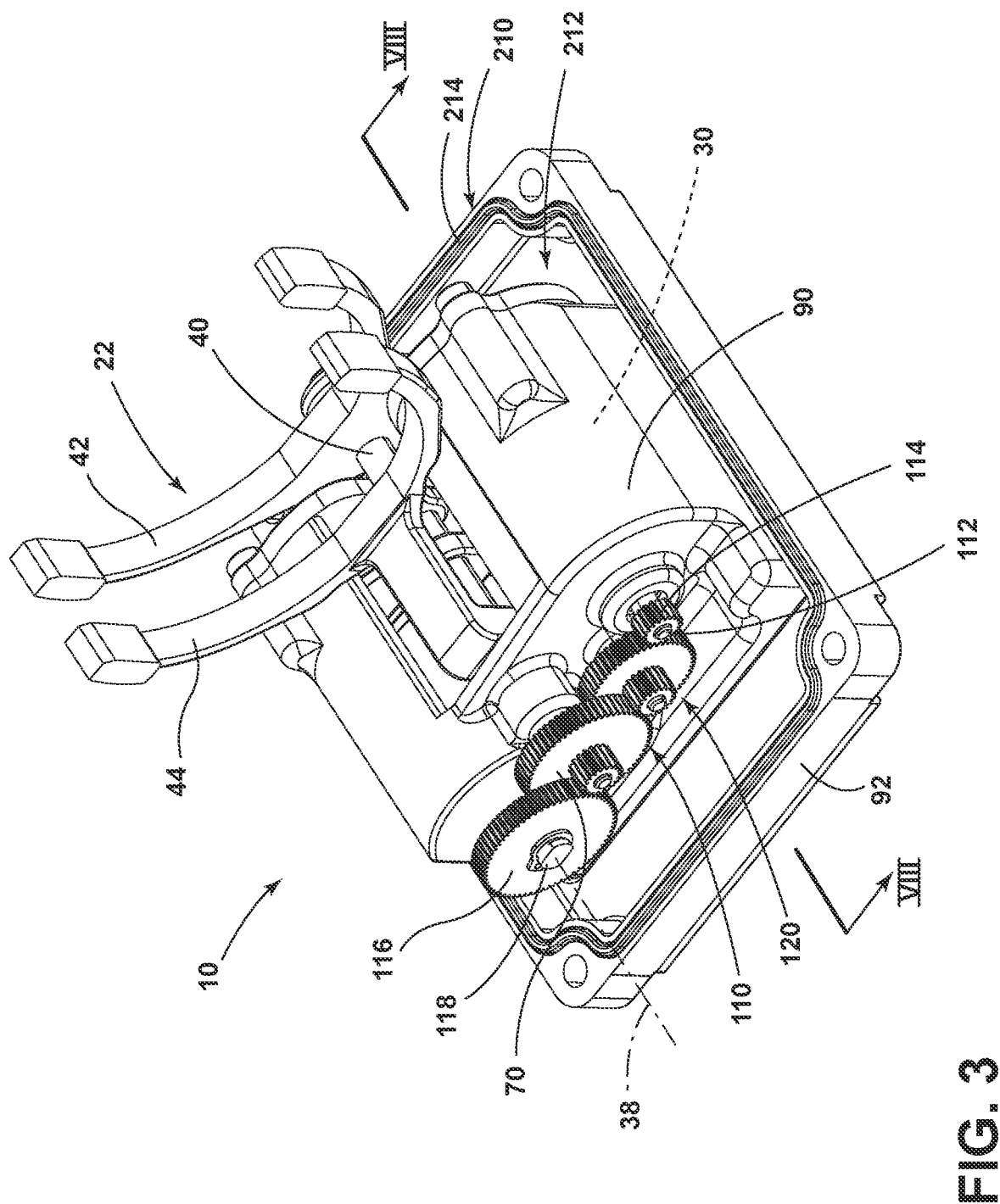
FIG. 3 is a top perspective view of an aspect of the shift actuator attached to a cover plate.
Figure 4:
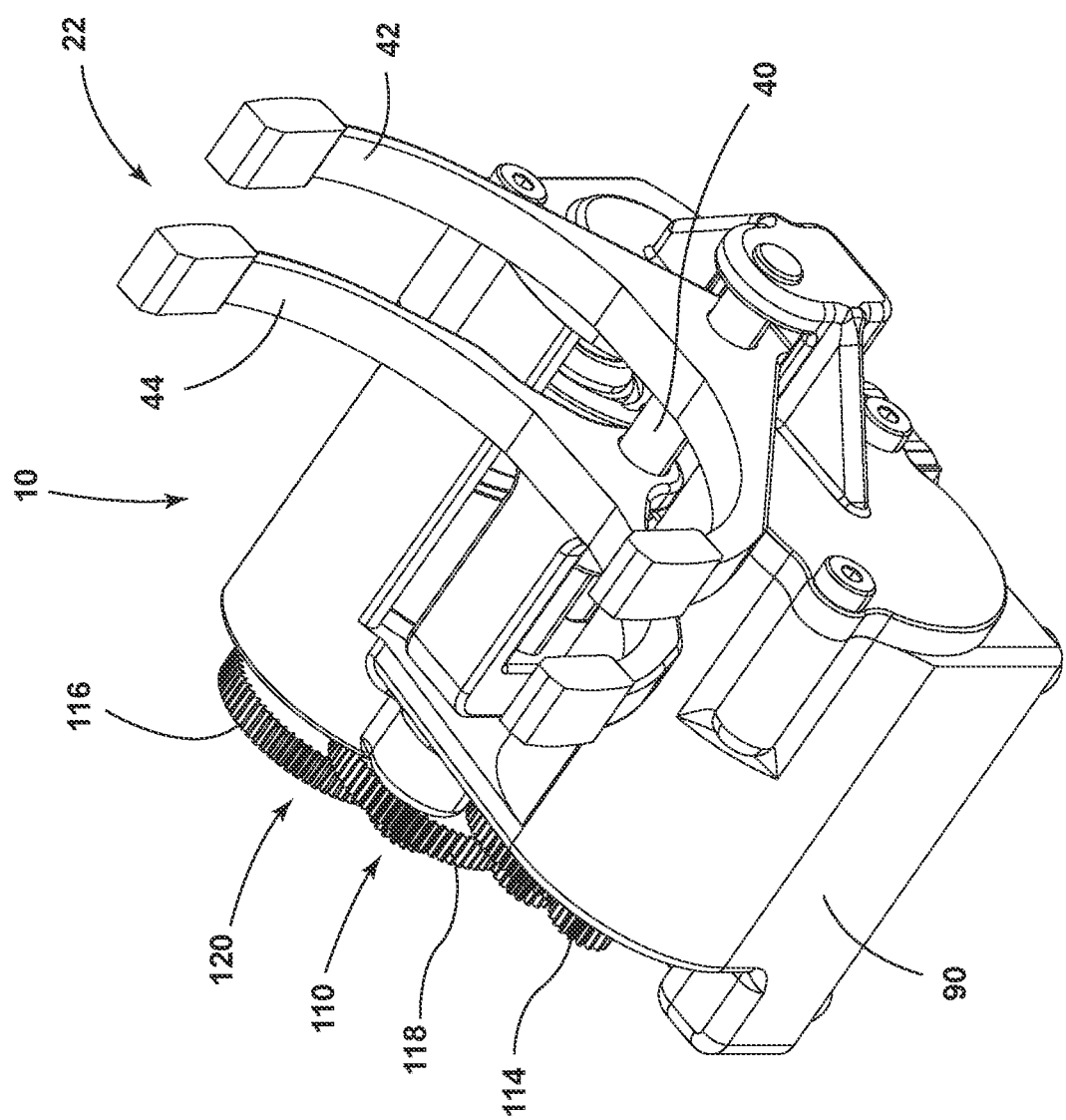
FIG. 4 is a perspective view of the shift actuator with the cover plate removed.
Figure 5:
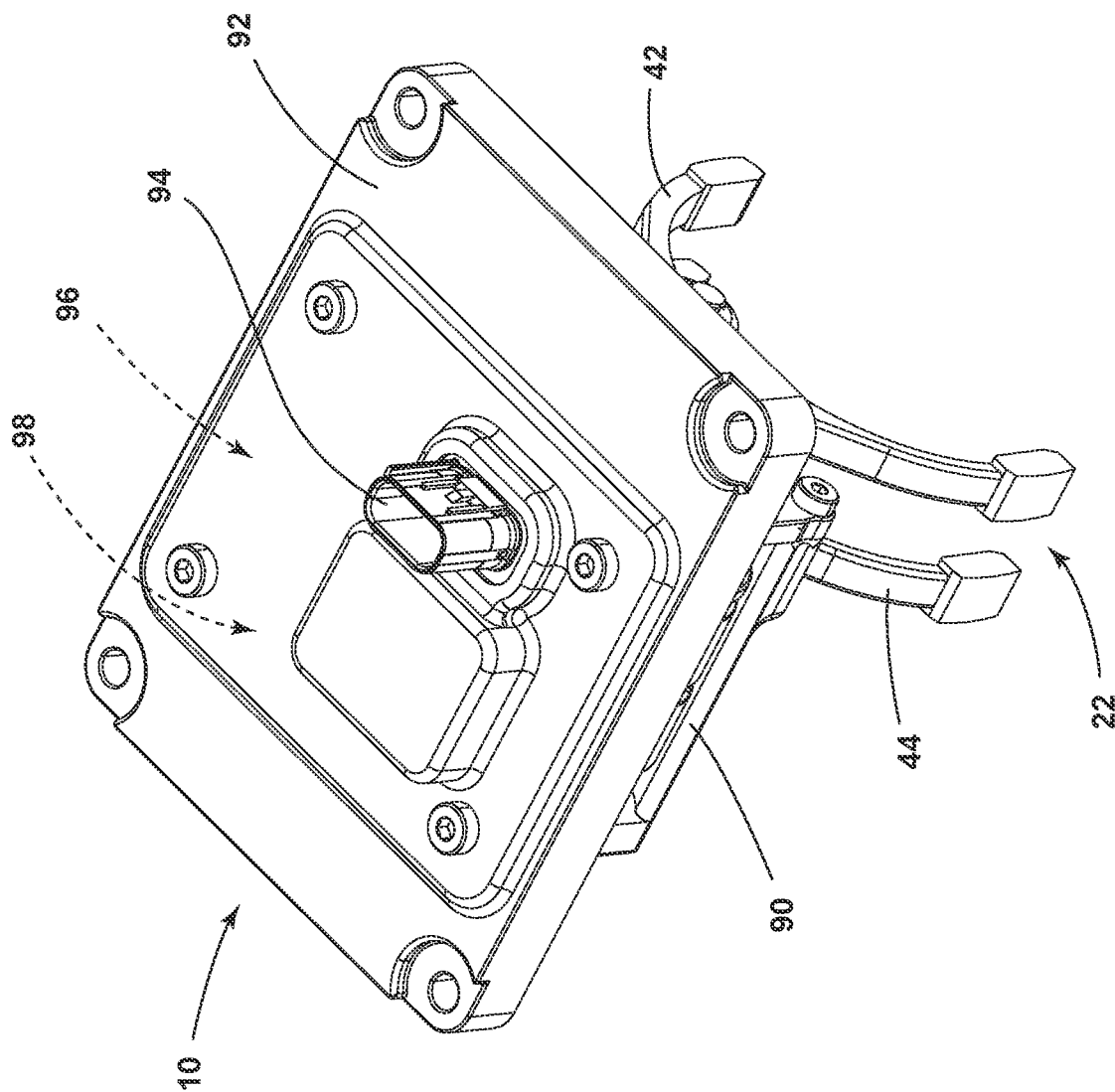
FIG. 5 is a bottom perspective view of the shift actuator of FIG. 3 and showing an aspect of a connection terminal.
Figure 6:
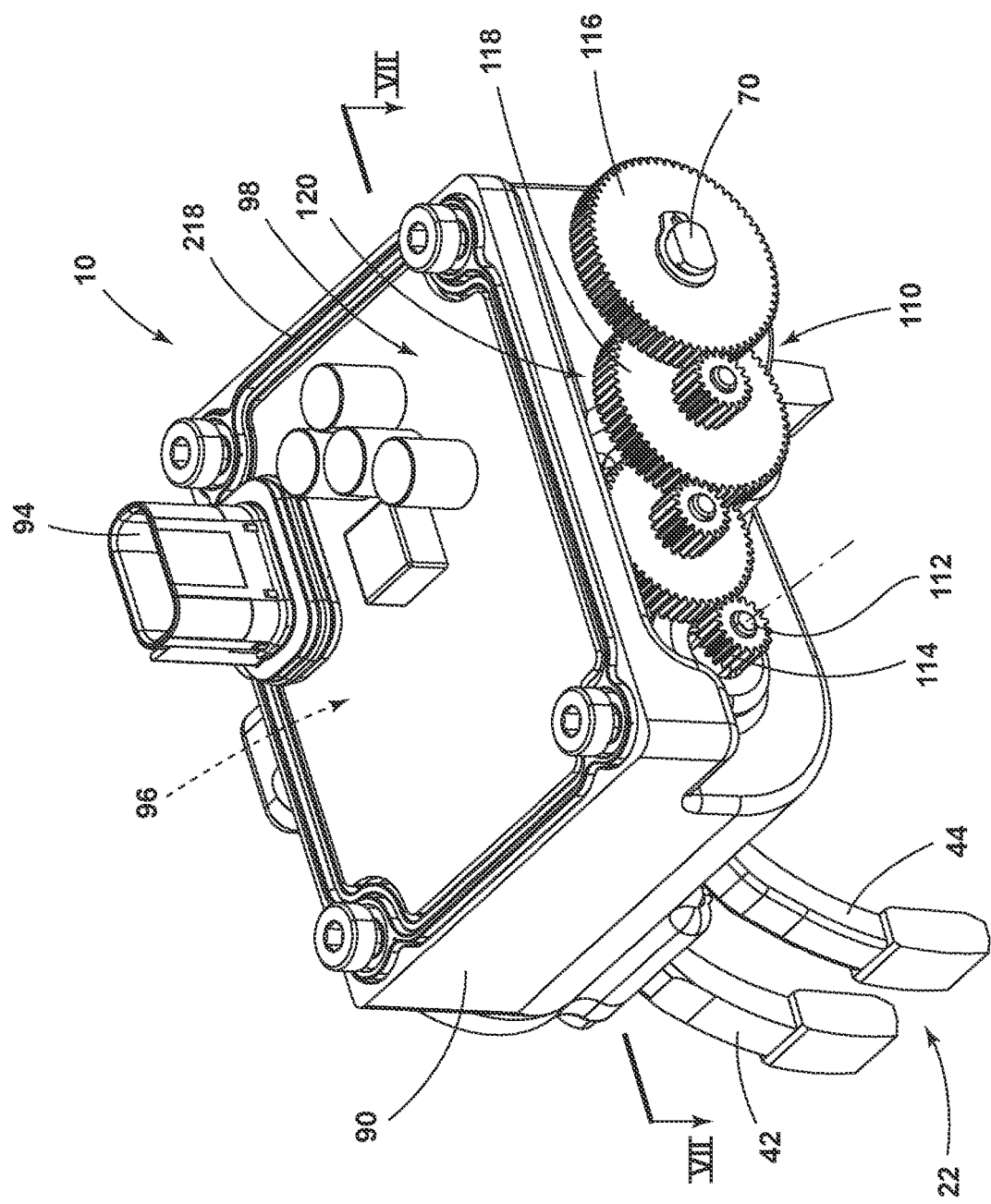
FIG. 6 is a bottom perspective view of the shift actuator of FIG. 4 and showing the printed circuit board of the shift actuator.
Figure 7:
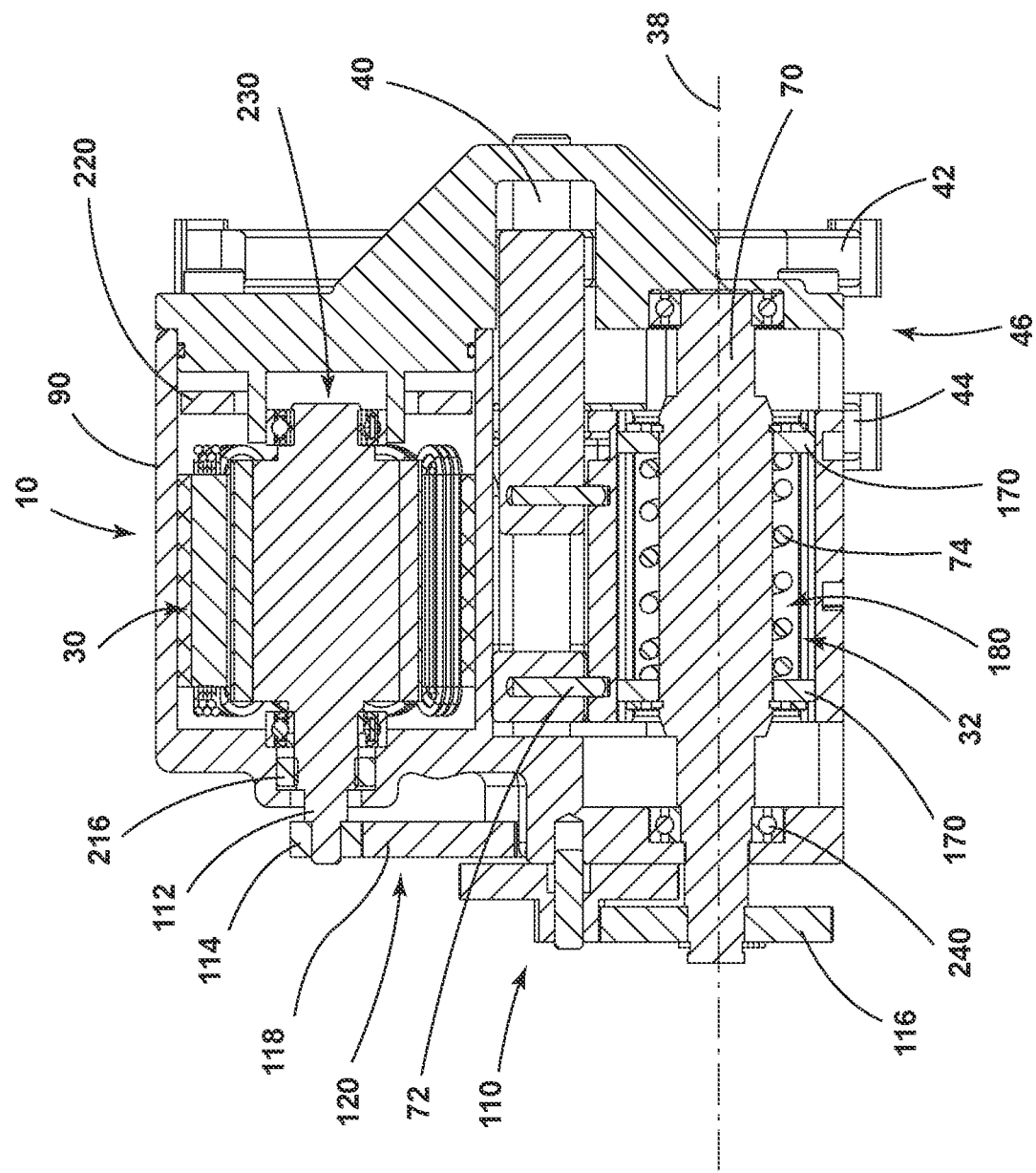
FIG. 7 is a cross-sectional view of the shift actuator of FIG. 6 taken along line VII-VII.
Figure 8:
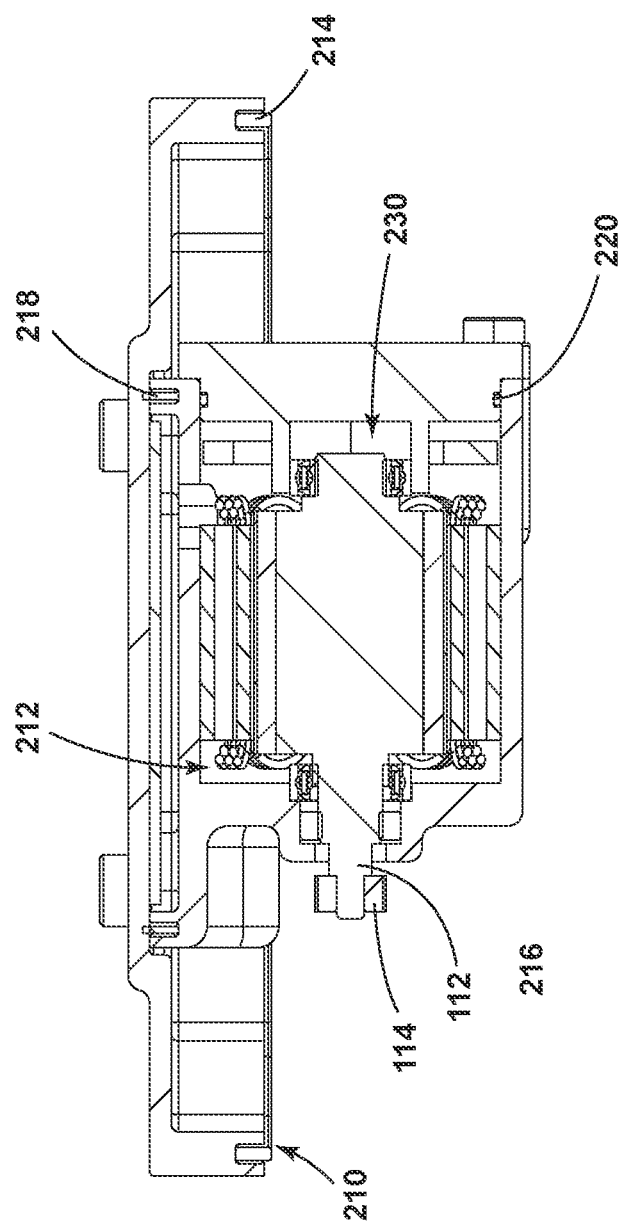
FIG. 8 is a cross-sectional view of the shift actuator of FIG. 3 taken along line VIII-VIII.
Figure 9:
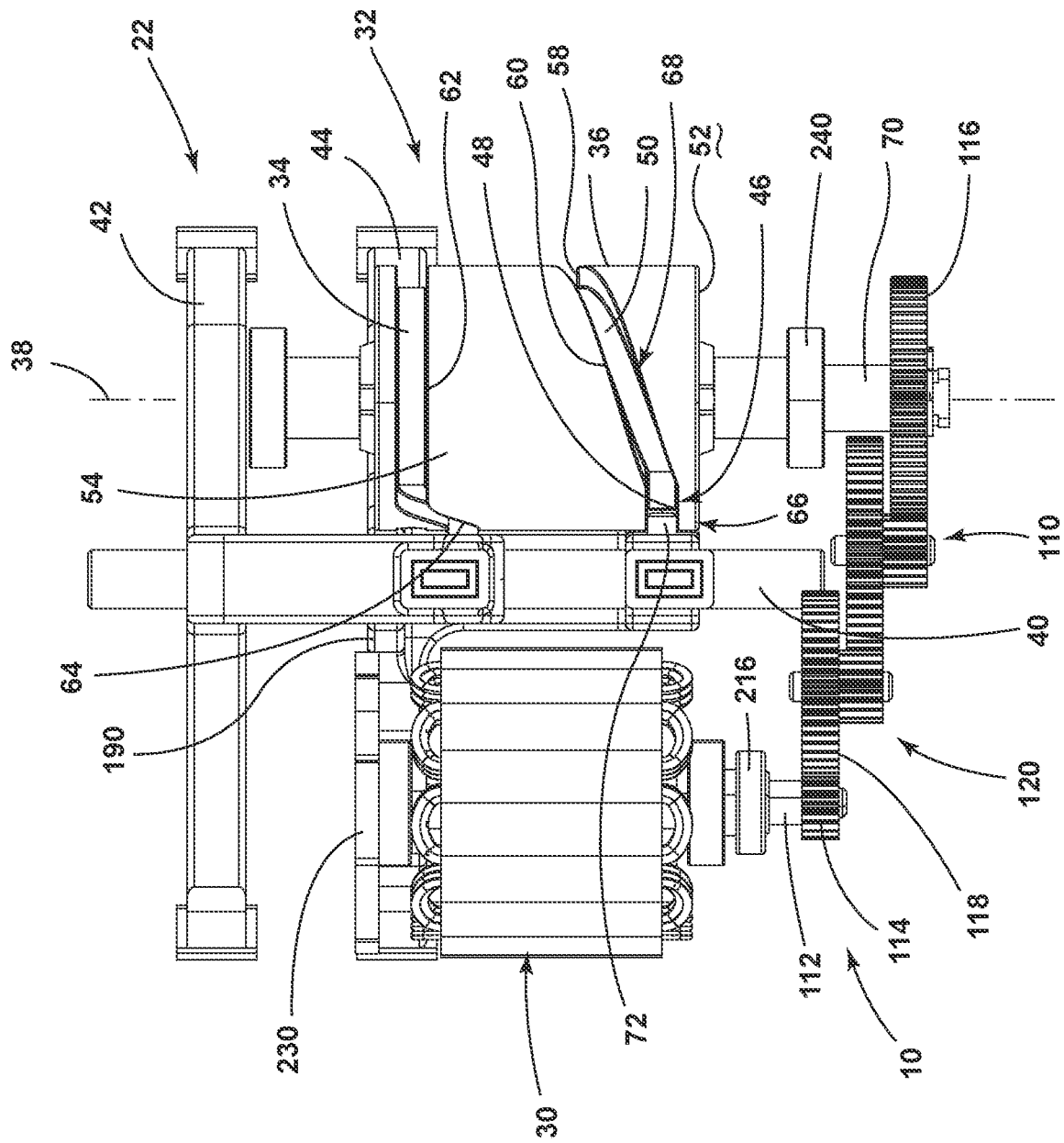
FIG. 9 is a side elevation view of the shift actuator with the outer housing removed.
Figure 10:
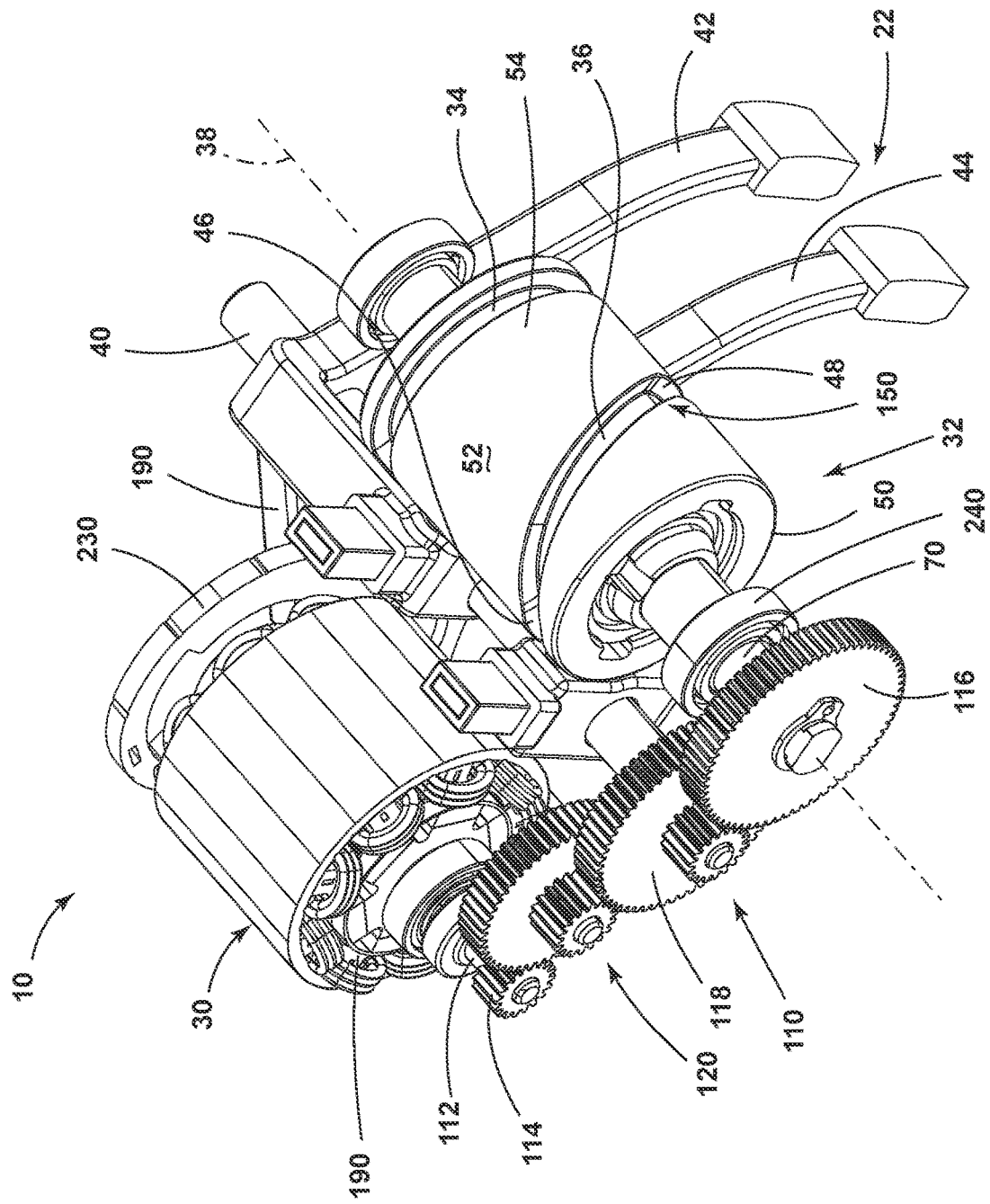
FIG. 10 is a perspective view of a shift actuator of FIG. 9.
Figure 11:
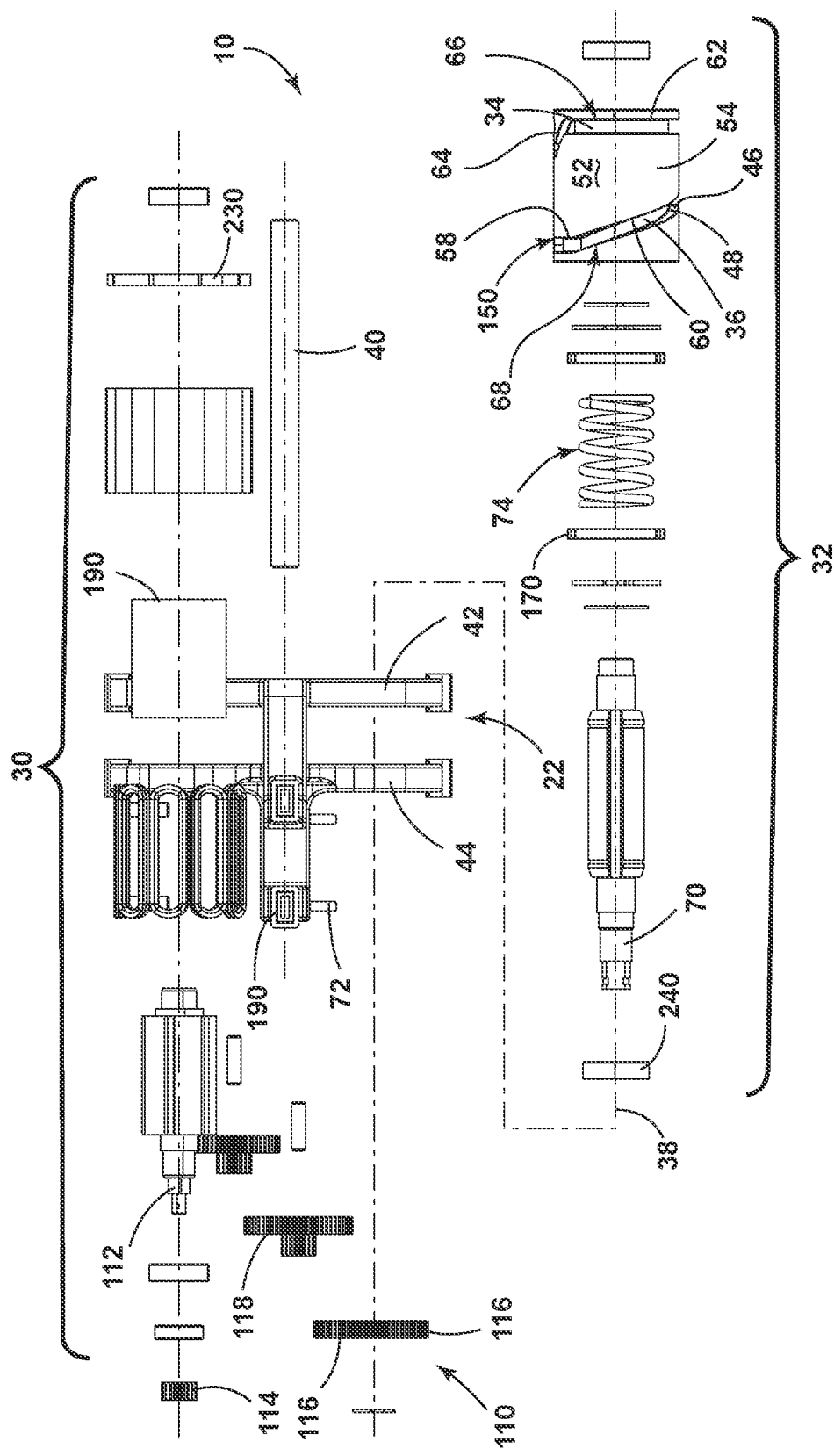
FIG. 11 is an exploded plan view of the shift actuator of FIG. 10.
Figure 12:
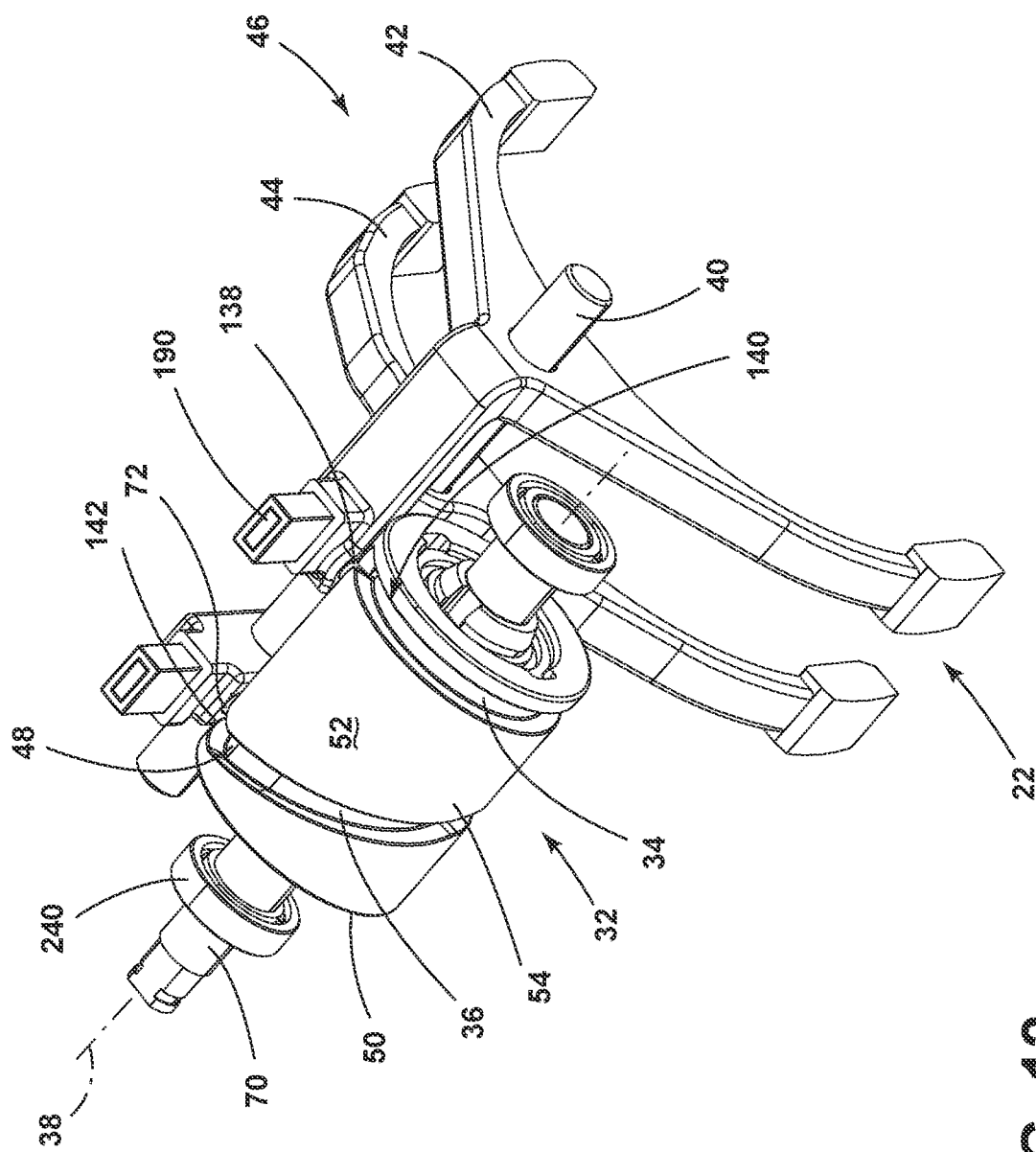
FIG. 12 is a perspective view of an aspect of the shift actuator showing the drum assembly in relation to the displacement and range forks.
Figure 13:
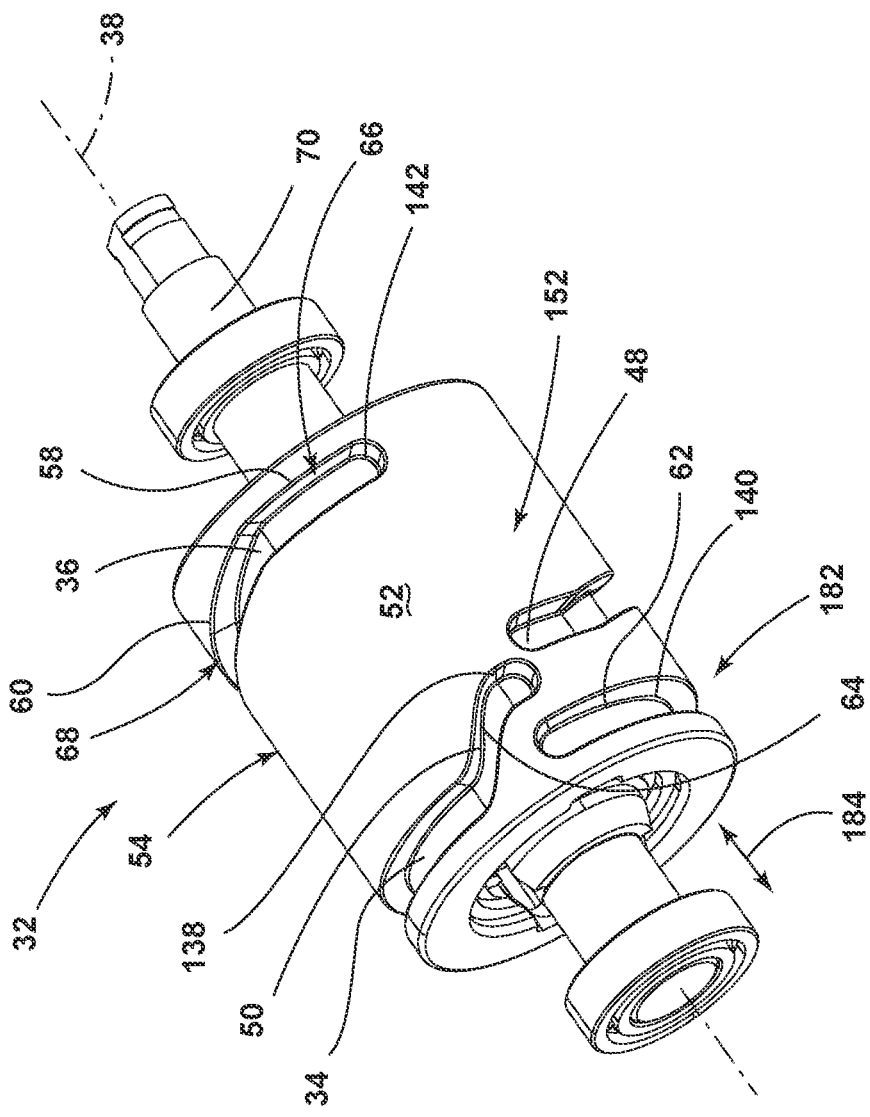
FIG. 13 is a perspective view of the drum assembly.
Figure 14:
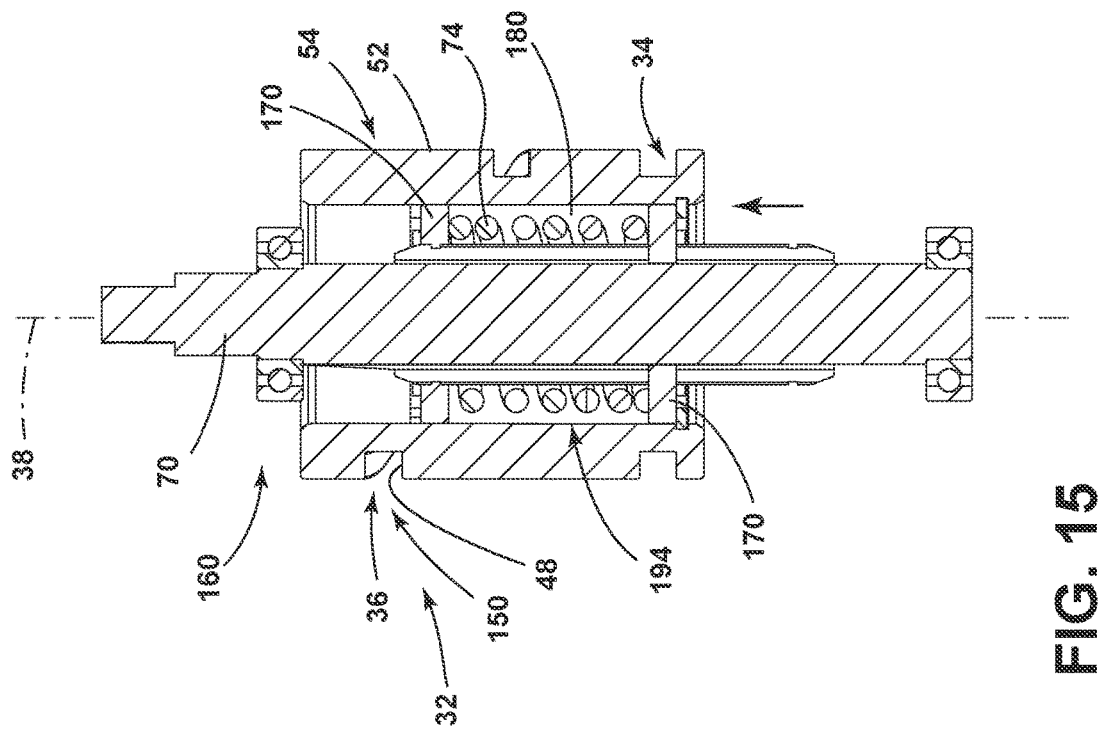
FIG. 14 is a cross-sectional view of the drum assembly of FIG. 13 and showing the drum cam in the shifting position.
Figure 15:
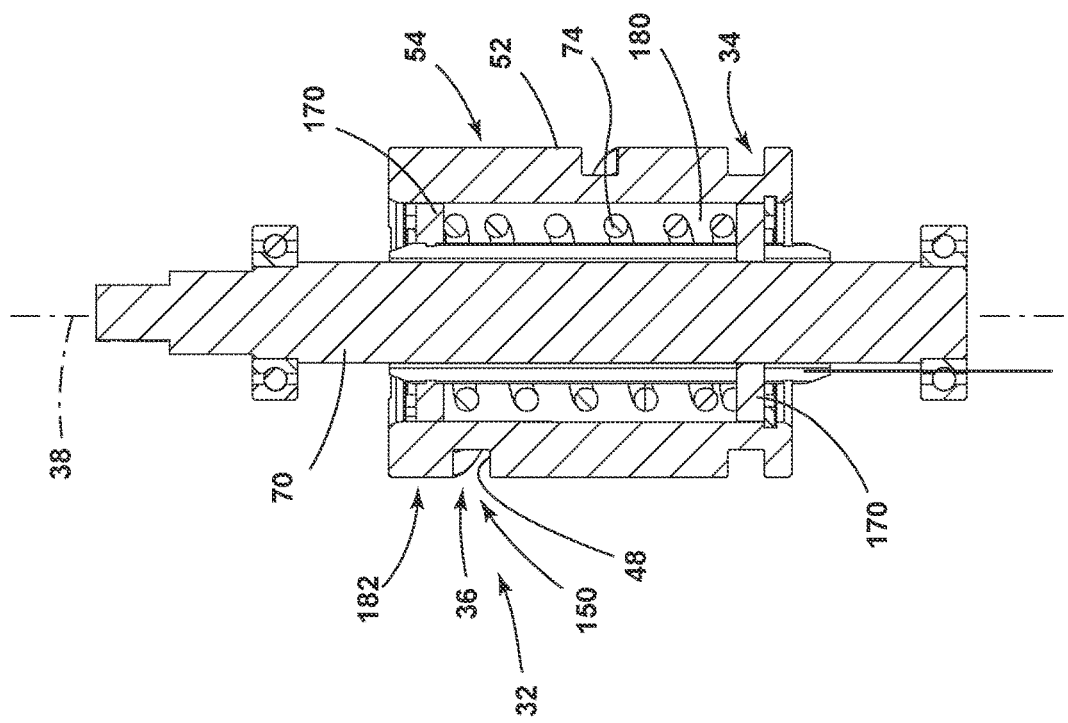
FIG. 15 is a cross-sectional view of the drum assembly of FIG. 14 and showing the drum cam and drum spring in a tolerance position.
Figure 16:
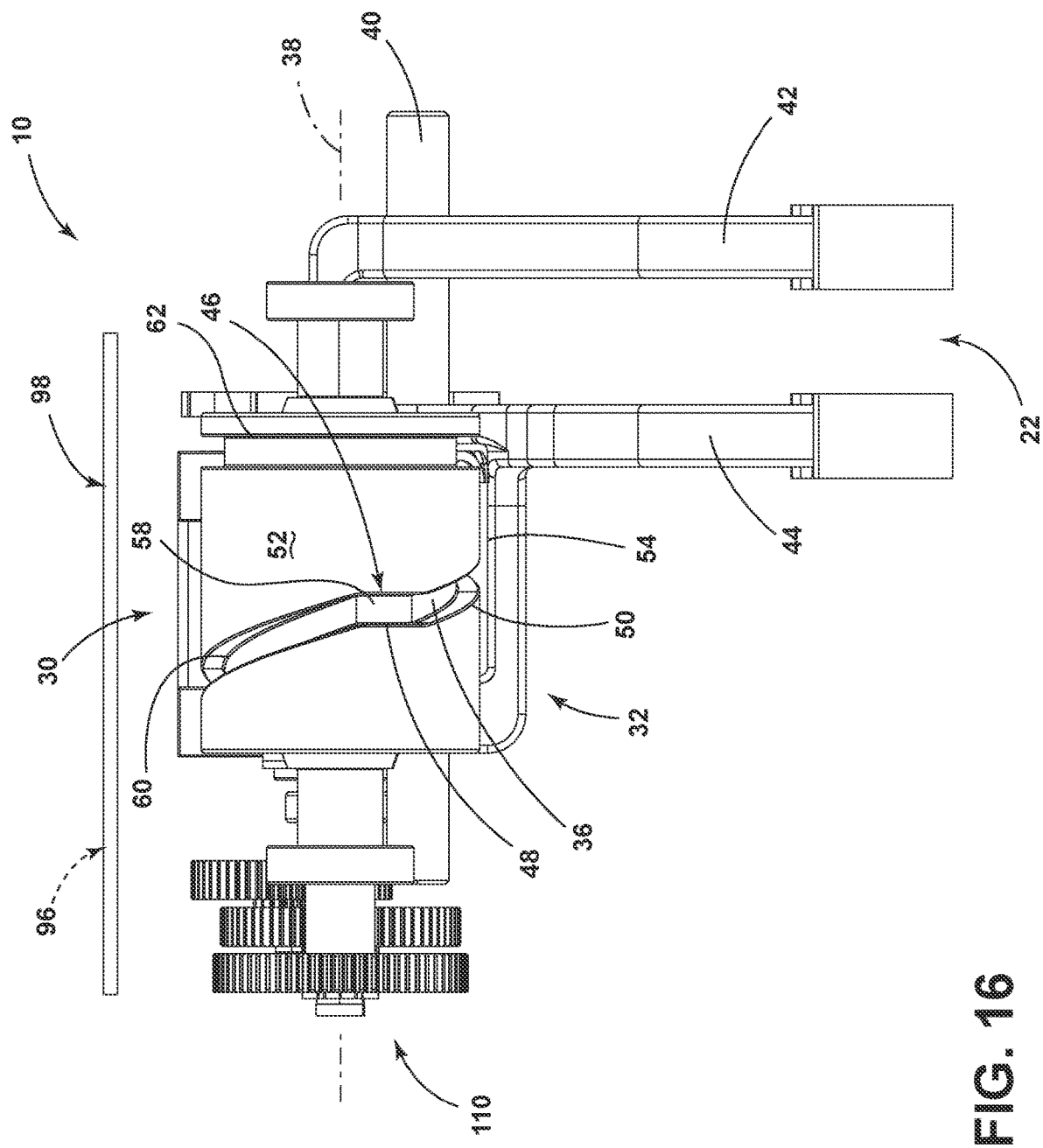
FIG. 16 is a side elevational view of an aspect of the shift actuator and showing the printed circuit board in relation to the shift actuator.
Figure 18:
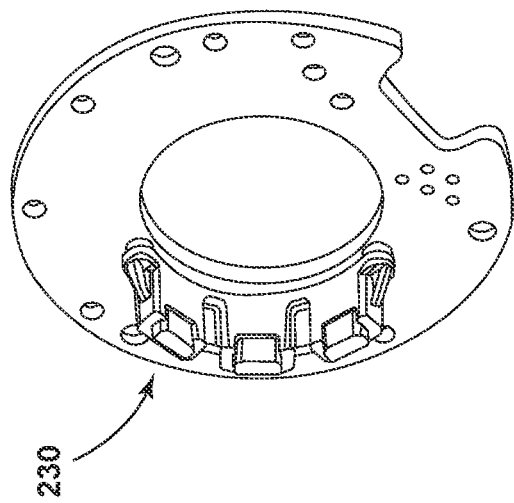
FIG. 18 is a perspective view of the senor assembly for the motor of FIG. 17.
Figure 17:
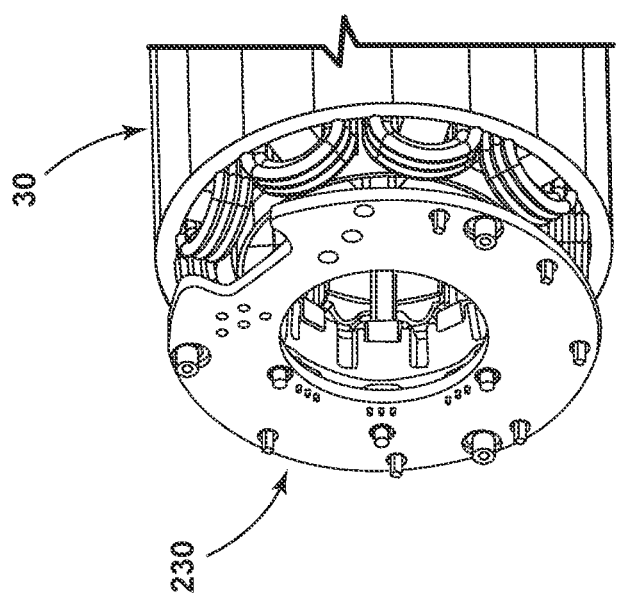
FIG. 17 is a perspective view of an aspect of the position sensor for the motor shift actuator.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a shift actuator for a vehicle power transfer unit. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIGS. 1-24 and in particular, FIGS. 19-22, reference numeral 10 generally refers to a shift actuator that is incorporated within a power transfer unit 12 for a vehicle. Typically, the power transfer unit 12 is coupled with a differential of the vehicle for providing a shifting function within the differential to move the transmission and differential between a two-wheel drive setting 14, a four-wheel drive high speed setting 16, a four-wheel drive low speed setting 18 (for towing and off-road conditions) and a neutralized setting 20 for shifting the differential between the four-wheel drive high speed setting 16 and the four-wheel drive low speed setting 18.

Referring again to FIGS. 1-22, the shift actuator 10 for the power transfer unit 12 includes a motor 30 that drives a drum assembly 32 having a disconnect track 34 and a range track 36. Operation of the motor 30 rotates the drum assembly 32 about a rotational axis 38. A fork rod 40 is positioned parallel with the rotational axis 38 and is typically held in a fixed position with respect to the motor 30 and the drum assembly 32. A fork assembly 22 is slidably coupled with the drum assembly 32 and the fork rod 40. The fork assembly 22 includes a disconnect fork 42 that is slidably coupled with the disconnect track 34 of the drum assembly 32 and the fork rod 40. The fork assembly 22 also includes a range fork 44 that is slidably coupled with the range track 36 of the drum assembly 32 and the fork rod 40. The disconnect track 34 and the range track 36 define a plurality of actuating positions 46 of the disconnect fork 42 and the range fork 44, respectively. Each actuating position 46 of the plurality of actuating positions 46 is defined by corresponding flat portions 48. In particular, each actuating position 46 is represented by a corresponding flat portion 48 within at least one of the disconnect track 34 and the range track 36. These corresponding flat portions 48 maintain the positions of the disconnect fork 42 and the range fork 44, respectively, relative to the fork rod 40. The various flat portions 48 of the disconnect track 34 and the range track 36 are connected via sloped portions 50 of each of the disconnect track 34 and range track 36. Accordingly, the disconnect track 34 and range track 36 of the drum assembly 32 circumscribes an outer surface 52 of the drum cam 54 of the drum assembly 32 for operating the disconnect fork 42 and the range fork 44.

In certain aspects of the device, each of the disconnect track 34 and the range track 36 include flat portions 48 that define the actuating positions 46 and sloped portions 50 that connect the various flat portions 48. The range track 36 includes range flat portions 58 that are connected by range sloped portions 60. Similarly, the disconnect track 34 includes disconnect flat portions 62 that are connected by disconnect sloped portions 64. The range flat portions 58 and the disconnect flat portions 62 cooperate to define the various actuating positions 46. As will be discussed herein, these actuating positions 46 define low-torque areas 66 of the drum cam 54 where a lower toque output of the motor 30 is utilized to rotate the drum cam 54 and operate the disconnect fork 42 and the range fork 44. Conversely, the range sloped portions 60 and the disconnect sloped portions 64 define increased-torque areas 68 of the motor 30. Accordingly, in the range sloped portions 60 and the disconnect sloped portions 64, the motor 30 may require a greater torque output to rotate the drum cam 54 and operate the disconnect fork 42 and the range fork 44.

Referring again to FIGS. 3-16, the drum assembly 32 includes a drum cam 54 and a drum shaft 70. The drum cam 54 and the drum shaft 70 are rotationally fixed with respect to one another. In this manner, operation of the motor 30 rotates the drum shaft 70 about the rotational axis 38. The drum cam 54 rotates with the drum shaft 70. This rotation of the drum cam 54 results in a translation of the disconnect fork 42 and the range fork 44 along or through the disconnect track 34 and the range track 36, respectively, that circumscribe the outer surface 52 of the drum cam 54. Fork pins 72 extend from each of the disconnect fork 42 and the range fork 44 and engage the disconnect track 34 and a range track 36 of the drum cam 54, respectively. Through this configuration, the disconnect track 34 and the range track 36 can each define a channel that is defined within the outer surface 52 of the drum cam 54. These channels receive each fork pin 72 and slidably operate each of the disconnect and range forks 42, 44 along the fork rod 40 for defining the various actuating positions 46 of the shift actuator 10. As will be described more fully below, a drum spring 74 is positioned within the drum assembly 32 for providing a tolerance functionality that allows for a delayed engagement of the various splines 76 of the power transfer unit 12. In the various aspects of the device, the disconnect track 34 and the range track 36 can be defined within grooves or channels that are raised proud of the outer surface 52 of the drum cam 54. The grooves or channels of the outer surface 52 of the drum cam 54 can also be defined within the outer surface 52 of the drum cam 54, as exemplified in FIGS. 9-13.

Referring again to FIGS. 3-8, the shift actuator 10 is positioned within an outer housing 90 that surrounds the motor 30, drum assembly 32 and fork rod 40. Additionally, a cover member 92 engages the outer housing 90 to secure the shift actuator 10 to the power transfer unit 12. An electrical connector 94 extends through the cover member 92 to receive connecting wires that provide electrical power to the shift actuator 10 and also provide for a transfer of data communications between the shift actuator 10 and a controller 96 for the vehicle. In certain aspects, the controller 96 for the shift actuator 10 can be an on-board controller 96 that can be located on a printed circuit board (PCB) 98. The PCB 98 is secured within the outer housing 90, where the PCB 98 includes various controlling features for operating the shift actuator 10 relative to the power transfer unit 12. Various sealing engagements 210 and one or more gaskets are positioned between the housing and the cover member 92. These sealed engagements protect the PCB 98 and the inner workings of the shift actuator 10, as well as the power transfer unit 12, from unwanted fluid infiltration and infiltration of various debris and particulate material into the inner workings of the shift actuator 10.

Referring again to FIGS. 3-8, the outer housing 90 also positions a gear train 110 that extends between a drive shaft 112 for the motor 30 and the drum shaft 70. This gear train 110 can include a drive gear 114 that is attached to the gear shaft for the motor 30 and an operating gear 116 that is attached to the drum shaft 70. Various idler gears 118 can be included within the gear train 110 to extend between the drive gear 114 and the operating gear 116. In addition, the gear train 110 can include various sized gears to provide for a reduction mechanism 120 for increasing the mechanical advantage of the motor 30 and operating the drum assembly 32, the disconnect fork 42 and the range fork 44.

Referring again to FIGS. 1 and 2, the shift actuator 10 is positioned within the power transfer unit 12. The power transfer unit 12 typically includes lateral splines 76 that extend transversely through the power transfer unit 12. The shift actuator 10 operates to change the position of the various splines 76 in order to modify the power transfer unit 12 between the two-wheel drive setting 14, the four-wheel drive high speed setting 16 and the four-wheel drive low speed setting 18. In addition, one or more neutralized settings 20 are defined by the shift actuator 10 for translating the power transfer unit 12 between the actuating positions 46 described herein. According to various aspects of the device, it is contemplated that additional actuating positions 46 are contemplated within the power transfer unit 12. Typically, the shift actuator 10 is a two-speed shift actuator 10 that is configured to operate the shift actuator 10 between the four-wheel drive high speed setting 16 and the four-wheel drive low speed setting 18, as well as operating between the four-wheel drive high speed setting 16 and the two-wheel drive setting 14.

Referring again to FIGS. 9-22, during operation of the shift actuator 10, the motor 30 rotates the drive shaft 112 and, in turn, the gear train 110. The drive gear 114 manipulates the gear train 110 to rotate the operating gear 116. The operating gear 116, which is coupled to the drum shaft 70, rotates the drum assembly 32 about the rotational axis 38. Typically, the motor 30 will be activated when the disconnect fork 42 and range fork 44 are positioned within one of the flat portions 48 that defines a particular actuating position 46 of the plurality of actuating positions 46. Using this flat portion 48, the motor 30 will initially experience a minimal amount of load at startup due to the disconnect and range forks 42, 44 not moving in an axial direction, along the rotational axis 38 of the drum assembly 32 and along the fork rod 40. These flat portions 48 can define the low-torque areas 66 wherein the motor 30 typically experiences less oppositional restrictions. Accordingly, the motor 30 is allowed to move substantially freely and build up inertia in the absence of the load from the disconnect and range forks 42, 44 and the remainder of the power transfer unit 12. As this inertia builds within the motor 30 at a startup condition 122, the inertia helps to overcome the initial load for moving the disconnect and range forks 42, 44 through the disconnect and range tracks 34, 36 and along the fork rod 40. This build up of inertia assists in moving the disconnect fork 42 and the range fork 44 through the sloped portions 50 of the disconnect track 34 and the range track 34. The sloped portions 50 of the disconnect track 34 and the range track 34 can define an increased-torque area 68 where the motor 30 experiences greater oppositional forces and requires a greater output torque to operate the disconnect fork 42 and the range fork 44.

The various opposing forces 130 that define the initial load that is exerted upon the motor 30 during operation of the shift actuator 10 can include friction forces of the disconnect fork 42 and range fork 44 moving within the disconnect track 34 and range track 36. These opposing forces 130 can also include forces related to the operation of the various splines 76 within the power transfer unit 12, operation of the drum spring 74 when the splines 76 of the power transfer unit 12 do not immediately align, and other various opposing forces 130 that may be exerted upon the motor 30 for operating the shift actuator 10 and the power transfer unit 12.

During initial startup condition 122 of the motor 30, as discussed herein, the initial load upon the motor 30 is relatively very low such that the motor 30 can build up inertia. Again, this inertia helps to overcome these opposing forces 130 of the shift actuator 10 and the power transfer unit 12 to assist the motor 30 in ramping up torque to operate the drum assembly 32 about the rotational axis 38. By allowing the motor 30 to build up inertia, the amount of torque output required by the motor 30 can be diminished and the size of the motor 30 can be downsized so that an initial ramping torque can be accounted for without upsizing the motor 30 within the shift actuator 10.

Referring again to FIGS. 9-22, the flat portions 48 of the disconnect track 34 and range track 36 are typically aligned to define the various actuating positions 46. Accordingly, each actuating position 46 of the plurality of actuating positions 46 is defined by a flat portion 48 of each of the range track 36 and disconnect track 34 of the drum cam 54. Operation of the disconnect fork 42 and range forks 44 is accomplished by rotating the drum cam 54 about the rotational axis 38. Each of the plurality of actuating positions 46 can be achieved by translating one or both of the disconnect fork 42 and range fork 44 along the fork rod 40. Accordingly, the various sloped portions 50 of the disconnect track 34 and range track 36 of the drum cam 54 include a range of sloped portions 50 that extend between the flat portions 48 of the disconnect track 34 and range track 36. The flat portions 48 are oriented generally perpendicular to the rotational axis 38 and the sloped portions 50 are oriented generally oblique to the rotational axis 38.

Figure 23:
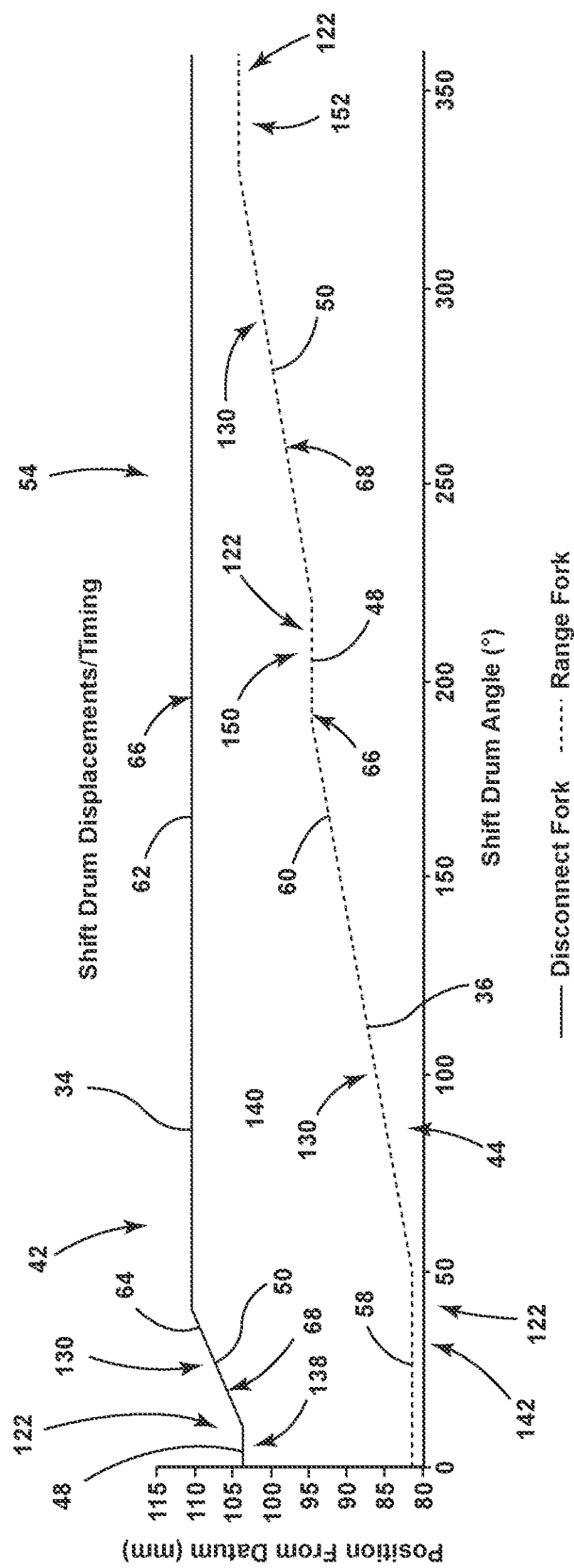
FIG. 23 is a schematic diagram illustrating positions of the shift actuator as represented in FIGS. 19-22.
Figure 24:
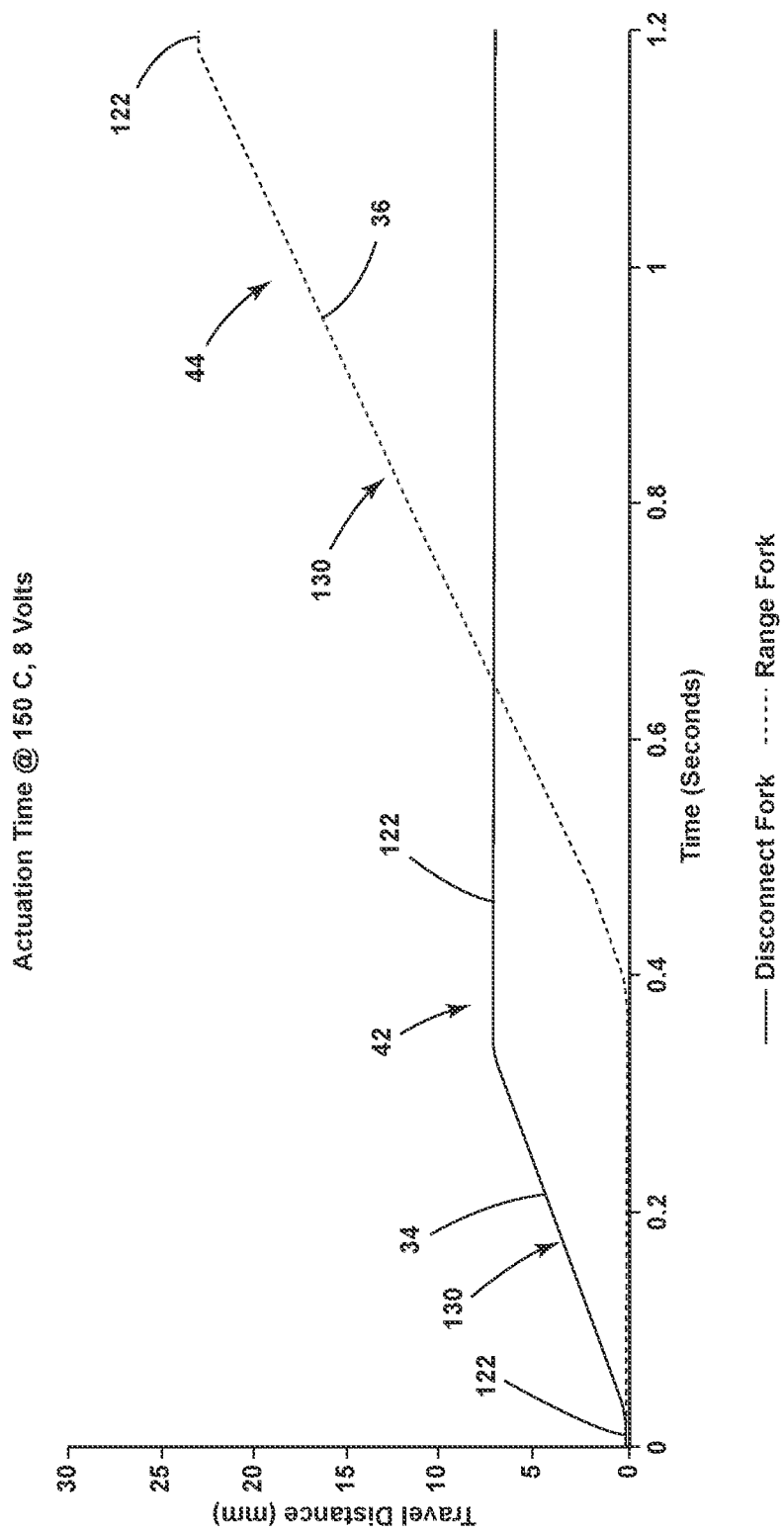
FIG. 24 is a schematic diagram illustrating a distance travel over time plot with reference to the shift actuator moving through the positions shown in FIGS. 19-22.

Referring now to FIGS. 19-22, an exemplary set of actuating positions 46 are shown within the drum assembly 32. It should be understood that this set of actuating positions 46 is an exemplary and non-limiting aspect of the device. In addition, FIGS. 23 and 24 illustrate operation of the drum cam 54 and the disconnect fork 42 and the range fork 44 that is reflected in the actuating positions of FIGS. 19-22.

Figure 19:
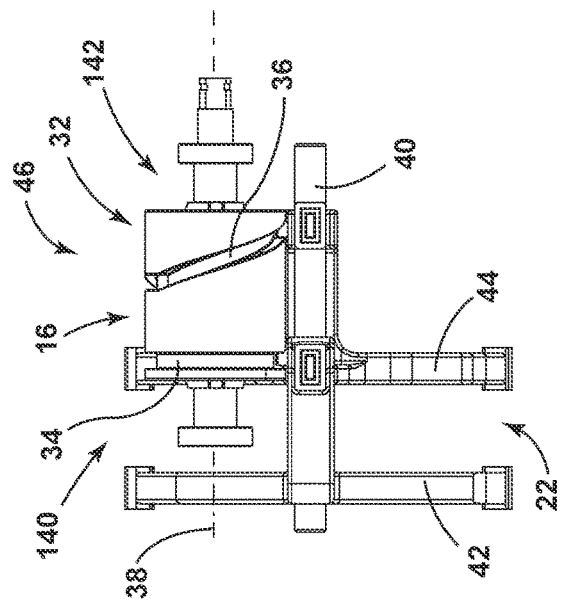
FIG. 19 is a side elevational view of the shift actuator shown in a two-wheel drive setting of the power transfer unit.

FIG. 19 is indicative of a two-wheel drive setting 14 of the shift actuator 10. This two-wheel drive setting 14 may be utilized when the vehicle is operating at higher speeds and relatively even terrain, such as along an expressway or other higher speed road. In this position, the disconnect track 34 moves the disconnect fork 42 to a disconnect position 138 and the range fork 44 is in a high position 142. It is contemplated that the translation of the shift actuator 10 from the four-wheel drive high speed setting 16 and the two-wheel drive setting 14 can be automatic or can be manually initiated.

Figure 20:
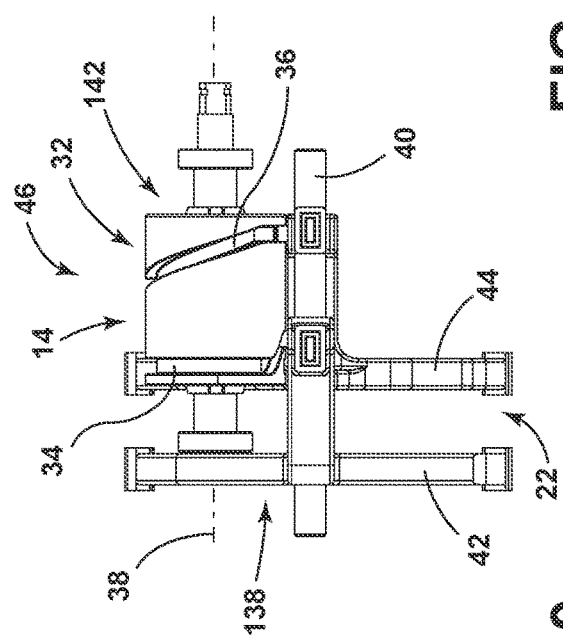
FIG. 20 is a side elevational view of the shift actuator shown in a four-wheel drive, high-speed setting of the power transfer unit.

FIG. 20 reflects a four-wheel drive high speed setting 16, where the disconnect fork 42 is now connected by translation of the drum cam 54 about the rotational axis 38. This rotation moves the disconnect fork 42 to the connect position 140 to engage the four-wheel drive high speed setting 16 of the differential. The range fork 44 is maintained in the high position 142, reflecting the high-speed operation of the vehicle. Typically, the four-wheel drive high speed setting 16 is a default position of the shift actuator 10 and is used during acceleration of the vehicle, lower speed operation, and other typical case conditions of the vehicle.

Figure 21:
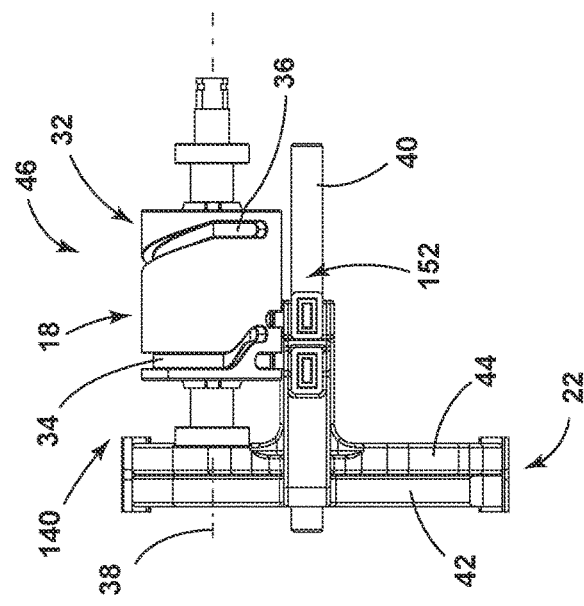
FIG. 21 is a side elevational view of the shift actuator shown in a neutralized setting of the power transfer unit.
Figure 22:
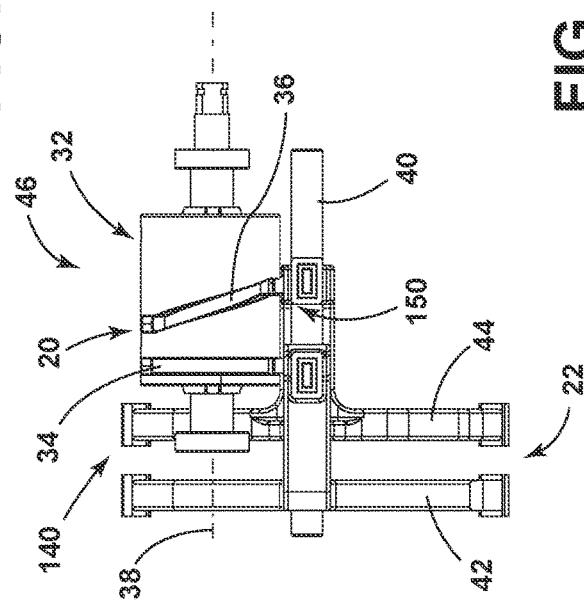
FIG. 22 is a side elevational view of the shift actuator shown in a four-wheel drive, low-speed setting of the power transfer unit.

FIG. 21 reflects a neutralized setting 20 of the drum assembly 32, where the shift actuator 10 and the power transfer unit 12 are translated between a four-wheel drive high speed setting 16 to a four-wheel drive low speed setting 18. In this neutralized setting 20, the splines 76 of the power transfer unit 12 (shown in FIGS. 1 and 2) are momentarily separated or otherwise disconnected to modulate the power transfer unit 12 from the high-speed setting to the low-speed setting. To move into this neutralized setting 20, the drum cam 54 rotates around the rotational axis 38 to move the range fork 44 to a neutral position 150 that is typically between a low position 152 and the high position 142. The neutralized setting 20 is defined by a flat portion 48 of the range track 36 that is in the middle of two separate sloped portions 50 that are between the high position 142 and the low position 152. After reaching the neutral portion of the range track 36, the drum cam 54 continues to rotate about the rotational axis 38 to move the range fork 44 to the low position 152 of the range track 36 reflected by FIG. 22.

As discussed above, each of these actuating positions 46 of the plurality of actuating positions 46, reflected in FIGS. 19-22, is typically accompanied by a flat portion 48 for each of the disconnect track 34 and range track 36. Again, these flat portions 48 are for allowing the motor 30 to operate for at least a brief period of time to build up inertia while the various loads of the disconnect fork 42 and range fork 44 and the power transfer unit 12 are temporarily kept away from the motor 30. In this unloaded startup condition 122 of the motor 30, the motor 30 is allowed to build up this inertia within the flat portions 48 of the disconnect and range tracks 34, 36. As this inertia builds up, the motor 30 is better able to rotate the drum assembly 32 and drum cam 54 about the rotational axis 38 to translate the disconnect fork 42 and/or the range fork 44 along the rotational axis 38 of the drum assembly 32 and along the fork rod 40.

Referring now to FIGS. 13-16, the drum assembly 32 can include a drum spring 74 that provides a compliance function for the shift actuator 10. As discussed herein, operation of the disconnect fork 42 and range fork 44 serves to selectively engage and disengage various splines 76 in the power transfer unit 12. It is typical that these splines 76 may not immediately line up and engage one another during a compliance state 184. After completion of the compliance state 184, the splines 76 align in the desired meshing engagement to define the shifting state 182. After a certain amount of rotation of each of the splines 76, the splines 76 typically align and engage with one another to allow for proper operation of the power transfer unit 12 within a particular actuating position 46 of the plurality of actuating positions 46. When the selective engagement of the splines 76 go through the process of aligning in the compliance state 184, the disconnect fork 42 and range fork 44 may be unable to reach the desired actuator position until such time as the splines 76 of the power transfer unit 12 align and fully engage. To accommodate this temporary alignment period 160, the drum assembly 32 includes the drum spring 74 that is able to compress from either end to account for this alignment of the splines 76 during the compliance state 184. Tolerance forces can be exerted on the drum cam 54 and the drum spring 74, in an axial direction, during the compliance state 184. These tolerance forces serve to bias the drum cam 54 to a tolerance position 194, which results in a compression of the drum spring 74. Compression of the drum spring 74 from either end of the drum spring 74 allows the drum cam 54 to axially translate in either direction with respect to the disconnect fork 42 and the range fork 44. Accordingly, the disconnect fork 42 and range fork 44 may experience a similar translation as the drum cam 54 translates along the rotational axis 38 during the alignment period 160 of the splines 76. After the splines 76 align, the tolerance forces are removed and the drum spring 74 axially biases the drum cam 54 from the tolerance position 194 and back to the central shifting state 182.

The drum spring 74 includes opposing spring retainers 170 that are positioned at opposite ends of the drum spring 74. When the splines 76 of the power transfer unit 12 are temporarily out of alignment, the forks will continue to move as a result of operation of the motor 30 and the drum assembly 32. Because the disconnect fork 42 and range fork 44 are unable to move into the desired actuating position 46 until the splines 76 fully engage, the drum cam 54 is able to translate along the drum shaft 70 and the rotational axis 38 of the drum assembly 32. This translation of the drum cam 54 accounts for this alignment period 160 of the splines 76.

Depending upon which of the disconnect fork 42 and range fork 44 is experiencing this alignment of the splines 76, the drum cam 54 can translate in an axial manner and in either direction along the drum shaft 70 and the rotational axis 38 of the drum assembly 32. Accordingly, the spring retainers 170 slidably operate between the drum cam 54 and the drum shaft 70 to allow for the axial translation of the drum cam 54 during the alignment period 160 of the splines 76 for the power transfer unit 12. The spring retainers 170 are journaled between the drum cam 54 and the drum shaft 70 through various tab and slot interfaces. Accordingly, the spring retainers 170 are rotationally and laterally fixed between the drum cam 54 and the drum shaft 70. The spring retainers 170 are able to axially slide in the compliance space 180 defined between the drum cam 54 and the drum shaft 70. The drum spring 74 biases the drum cam 54 to a shifting state 182 of the drum assembly 32 where the drum cam 54 is centrally aligned along the drum shaft 70 and the flat portions 48 are indicative of the actuating positions 46. During the alignment period 160 of the splines 76 of the power transfer unit 12, the drum cam 54 can translate along the rotational axis 38 of the drum assembly 32 to define a compliant state of the drum assembly 32. In this compliance state 184, the drum cam 54 axially translates along the rotational axis 38 to allow for axial movement of the drum cam 54 relative to the drum shaft 70. In the compliance state 184, the drum cam 54 translates along the drum shaft 70. As a result of this translation, the disconnect fork 42, the range fork 44, or both, are translated away from the desired actuating position 46 until such time as the splines 76 align and the drum assembly 32 returns to the shifting state 182.

As discussed herein, the compliance state 184 is initiated when the disconnect fork 42 or range fork 44, or both, may not be able to translate along the fork rod 40 and into the actuating position 46 until such time as the splines 76 of the power transfer unit 12 properly engage one another to define the particular actuating position 46 of the shift actuator 10 and the power transfer unit 12. Using this configuration, the drum spring 74 and the drum cam 54 operate between the shifting state 182 and the compliance state 184. The compliance state 184 is configured to absorb tolerances in the system of the power transfer unit 12 that may be caused by a delay in the alignment of the splines 76 and the motion of the disconnect fork 42 and the range fork 44. Again, this delay of the motion of the disconnect fork 42 and the range fork 44 is typically caused by a temporary misalignment of the splines 76 for the power transfer unit 12. The journaled engagement between the spring retainers 170, the drum cam 54 and the drum shaft 70 provide for consistent rotational operation of the drum assembly 32 during the compliance state 184 and the shifting state 182.

Referring again to FIGS. 7-24, each of the disconnect and range forks 42, 44 can include position sensors 190 that engage with the PCB 98 to activate the position sensors 190 for monitoring the position of the disconnect fork 42 and range fork 44 relative to the fork rod 40 and the drum assembly 32. Through this configuration, when the disconnect fork 42 or the range fork 44 reaches the appropriate actuating position 46, the position sensors 190 defined by the disconnect fork 42, range fork 44 and the PCB 98 communicate with the motor 30 to stop rotating as the desired actuating position 46 has been achieved.

In certain conditions, where the alignment condition of the splines 76 is exceptionally long, the drum cam 54 may over rotate past the actuating position 46. In such a condition, the various sensors of the drum assembly 32 may recognize this over rotation and reverse operation of the motor 30 to align the drum cam 54 with the disconnect and range forks 42, 44 to define the proper actuating position 46. Typically, the shift actuator 10 can include one or more current sensors that monitor the operation of the motor 30. These current sensors monitor when the motor 30 is drawing an appropriate amount of line electrical current that is indicative of the drum cam 54 being in the shifting state 182 and the disconnect fork 42 and range fork 44 being in the expected rotational position within the disconnect track 34 and range track 36. The current sensors can also monitor when a greater amount of line current is drawn by the motor 30 for maintaining the drum cam 54, the disconnect fork 42 and/or range fork 44 in a particular rotational position. The drawing of an excessive line current is indicative of the motor 30 being in a loaded condition, such as within the sloped portions 50 of the disconnect track 34 and range track 36, rather than an unloaded condition that is typically present in the flat portions 48 that define the actuating positions 46. The presence of the excessive line electrical current can indicate when the motor 30 has over rotated or under rotated the drum cam 54 during the axial operation of the drum cam 54 in the compliance state 184. The motor 30 can, in turn, be operated using the motor sensors 230 and the fork position sensors 190 to properly align the drum cam 54, the disconnect fork 42 and/or range fork 44 within the desired actuating position 46 and in the shifting state 182.

In certain aspects of the device, various torque sensors and position sensors can be attached or in communication with the motor 30 for recognizing when the disconnect fork 42, range fork 44, and drum cam 54 are all in proper alignment to define the actuating position 46 of the plurality of actuating positions 46. Where one or both of the disconnect fork 42 and range fork 44 are intended to be in a particular actuating position 46, but an over rotation results in the drum cam 54 engaging one of the fork pins 72 within the sloped portion 50, various external forces are typically exerted upon the drum cam 54 and at least one of the disconnect fork 42 and range forks 44. These external forces can be recognized and the motor 30 can be operated to align with the proper actuating position 46.

Referring again to FIGS. 1-24, the shift actuator 10 is used for disconnecting axles, and similar drive line or drive train components and changing gears within a drive unit assembly. The various drive units, as discussed herein, may include axles, differentials, power transfer units 12, and other similar drive train components. As discussed in exemplary fashion herein, the drive unit can be the power transfer unit 12, and rear drive module or a transfer case. One of the primary functions of the shift actuator 10 includes disconnecting the drive axles or splines 76 completely from the drive shaft 112 or transmission. Another primary function includes operating the shift actuator 10 to change gears from a high speed ratio to a low speed ratio (high range versus low range). To accomplish this shifting of gears and disconnect to the splines 76 of the drive axles, a controller 96 for the vehicle sends an actuating signal to move the disconnect fork 42 and range fork 44 to certain actuating positions 46. The shift actuator 10 then turns the motor 30 in a desired direction (clockwise or counterclockwise with respect to the rotational axis 38) to move the gear train 110 and rotate the drum shaft 70 of the drum assembly 32. The drum cam 54 is also rotated as a result of a rotation of the drum shaft 70. This rotation of the drum cam 54 converts the rotary motion of the drum cam 54 into a linear motion of the disconnect fork 42 and range fork 44 as a result of the disconnect track 34 and range track 36 that are defined within the surface of the drum cam 54. The rotational angle of the drum cam 54 with respect to the rotational axis 38 dictates the actuating position 46 of the disconnect fork 42 and range fork 44. The axial position of the disconnect fork 42 and range fork 44 is fed back to the controller 96 via the fork position sensors 190. As discussed herein, these fork position sensors 190 alert the motor 30 to stop rotation when the desired actuating position 46 is achieved.

Referring again to FIGS. 1-24, the use of the drum spring 74 is a compliance mechanism that allows for the alignment period 160 of the splines 76 of the drive unit, such as the power transfer unit 12. In a normal condition of the shift actuator 10, the drum spring 74 is not utilized, such as where the splines 76 immediately align within the power transfer unit 12. When the splines 76 are out of alignment during the alignment period 160, the shafts and shift collars or splines 76 are out of alignment for a temporary period of time. In certain instances, this can momentarily bind the system until the splines 76 and shafts are aligned. The drum spring 74 allows the motor 30 to continue rotation until the correct actuating position 46 is achieved. When the binding of the splines 76 for the power transfer unit 12 is no longer present, the spring biases the drum back to the shifting state 182 so that the disconnect and range forks 42, 44 will then bias the collars into the appropriate positions.

Referring again to FIGS. 1-24, the shift actuator 10 includes a sealing engagement 210 between the housing and the cover member 92, and between the cover member 92 and the remainder of the power transfer unit 12 to seal both from the environment and the lubricating fluid that is included within the particular drive unit that the shift actuator 10 is configured to operate. To seal this interior cavity 212 from the outer environment, a case seal 214 prevents infiltration and seals out fluid and other foreign particulate material. To seal the shift actuator 10 from the fluid, a dynamic seal 216, a PCB cavity seal 218, and an O-ring 220 are included. Using the cavity seal 218, the PCB 98 and motor 30 are designed to stay in a dry configuration. The gear train 110, disconnect and range forks 42, 44 and the drum assembly 32 are designed to allow for a certain amount of fluid or oil to engage in a submerged or splashing configuration.

The shift actuator 10 can be utilized within any one of various actuating assemblies for the vehicle. Typically, the shift actuator 10 is used within a power train or transmission component of the vehicle for shifting portions of the transmission between various actuating positions 46.

The drum assembly 32 can include various sensors, such as motor sensors 230 in the form of digital Hall sensors or a three dimensional linear Hall sensor. This motor sensor 230, as illustrated, can include plurality of digital Hall sensors, such as three digital Hall sensors, that can be used to monitor the rotational position of the motor 30. In addition, these digital Hall sensors serve to activate and deactivate the motor 30 according to the positions of fork position sensors 190 of the disconnect fork 42 and the range fork 44. In an exemplary aspect of the device, the fork position sensors 190 can be in the form of a Melexis linear position sensor.

Referring again to FIGS. 1-24, the drum shaft 70 is in an axially fixed position to rotate about the rotational axis 38. Various angular contact bearings 240 can be positioned on the drum shaft 70 to provide for rotational operation about the rotational axis 38, as well as maintaining the drum shaft 70 in the axially fixed position.

According to various aspects of the device, the shift actuator 10 is utilized for providing a shifting mechanism for operating the power transfer unit 12. In addition, the shift actuator 10 allows for tolerances and alignment conditions of the features of the power transfer unit 12 to maintain a consistent operation to prevent binding of the system during operation of the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A shift actuator comprising:
 a motor that drives a drum assembly having a disconnect track and a range track, wherein operation of the motor rotates the drum assembly about a rotational axis, wherein the drum assembly includes a drum cam and a drum shaft, wherein the drum cam and the drum shaft are rotationally fixed with respect to one another, and wherein the drum cam is axially slidable relative to the drum shaft;
 a fork rod that is positioned parallel with the rotational axis;
 a disconnect fork that is slidably coupled with the disconnect track and the fork rod;

a range fork that is slidably coupled with the range track and the fork rod, wherein:
the disconnect track and the range track define a plurality of actuating positions of the disconnect fork and the range fork; and
the plurality of actuating positions are defined by corresponding flat portions of the disconnect track and the range track that maintain a position of the disconnect fork and the range fork, respectively, relative to the fork rod.

2. The shift actuator of claim 1, wherein the drum cam includes a drum spring that is disposed within the drum cam, wherein the drum spring biases the drum cam toward a central shifting position.

3. The shift actuator of claim 2, wherein the drum spring is configured to absorb tolerance forces exerted by at least one of the disconnect fork and the range fork, wherein the tolerance forces axially bias the drum cam to a tolerance position that is axially distal from the central shifting position.

4. The shift actuator of claim 1, wherein the corresponding flat portions include flat portions of the range track and flat portions of the disconnect track.

5. The shift actuator of claim 4, wherein the flat portions of the range track are connected by sloped portions of the range track.

6. The shift actuator of claim 5, wherein the flat portions of the disconnect track are connected by sloped portions of the disconnect track.

7. The shift actuator of claim 6, wherein the sloped portions of the range track and the sloped portions of the disconnect track define areas where rotation of the drum cam corresponds to operation of at least one of the disconnect fork and the range fork, respectively, relative to the fork rod.

8. A shift actuator comprising:
a drum cam having a disconnect track and a range track, wherein the drum cam rotates about a rotational axis, wherein the drum cam is positioned around a drum shaft, wherein the drum cam and the drum shaft are rotationally fixed with respect to one another, and wherein the drum cam is axially slidable relative to the drum shaft;
a fork assembly that is positioned parallel with the rotational axis;
a fork rod that is positioned parallel with the rotational axis, wherein the fork assembly slidably couples the disconnect track with the fork rod and slidably couples the range track with the fork rod, wherein
the disconnect track and the range track define a plurality of actuating positions of the fork assembly that are oriented generally perpendicular to the rotational axis;
rotation of the drum cam with the fork assembly in one actuating position of the plurality of actuating positions defines a flat portion characterized by at least a portion of the fork assembly being maintained in a single axial position with respect to the drum cam; and
the rotation of the drum cam in the flat portion builds momentum for operating the fork assembly through sloped portions of the disconnect track and the range track, the sloped portions being oblique to the rotational axis.

9. The shift actuator of claim 8, wherein the fork assembly includes a disconnect fork that extends between the disconnect track and the fork rod, and wherein the fork assembly includes a range fork that extends between the range track and the fork rod.

10. The shift actuator of claim 8, wherein the fork assembly is in communication with a position sensor that is in communication with a controller, wherein operation of the drum cam operates forks between the plurality of actuating positions, and wherein the position sensor monitors an axial position of the fork assembly and communicates the axial position to the controller to operate an actuator.

11. The shift actuator of claim 10, wherein the actuator is a motor that is coupled to the drum cam via a gear train.

12. The shift actuator of claim 11, wherein the motor is positioned parallel with the drum cam with the fork rod positioned therebetween.

13. A shift actuator for a power transfer unit, the shift actuator comprising:
a motor that drives a drum assembly having a disconnect track and a range track, wherein operation of the motor rotates the drum assembly about a rotational axis, wherein the drum assembly includes a drum cam and a drum shaft, wherein the drum cam and the drum shaft are rotationally fixed with respect to one another, and wherein the drum cam is axially slidable relative to the drum shaft;
a fork rod that is positioned parallel with the rotational axis and between the motor and the drum assembly;
a disconnect fork that extends between the disconnect track and the fork rod;
a range fork that extends between the range track and the fork rod; and
a position sensor that is in communication with the motor and each of the disconnect fork and the range fork, wherein:
operation of the drum assembly slidably operates the disconnect fork through the disconnect track and along the fork rod relative to the position sensor;
operation of the drum assembly slidably operates the range fork through the range track and along the fork rod and relative to the position sensor; and
the position sensor communicates with a controller that is in communication with the motor to stop operation of the motor and the drum assembly when the disconnect fork and the range fork define an actuating position relative to the drum assembly.

14. The shift actuator of claim 13, wherein the disconnect fork and the range fork are coupled with transfer splines and operation of the disconnect fork and the range fork selectively engages and disengages the transfer splines.

15. The shift actuator of claim 14, wherein selective engagement of the transfer splines includes a compliance state where the transfer splines rotate with respect to one another to align and define a shifting state, wherein the drum cam axially operates with respect to the drum shaft during the compliance state.

16. The shift actuator of claim 15, wherein the drum cam includes a drum spring disposed within the drum cam, wherein the drum spring biases the drum cam toward a central shifting position when the transfer splines operate between the compliance state and the shifting state.

17. The shift actuator of claim 16, wherein the drum spring is configured to absorb tolerance forces exerted by at least one of the disconnect fork and the range fork during the compliance state, wherein the tolerance forces axially bias the drum cam to a tolerance position that is axially distal from the central shifting position.

\* \* \* \* \*